(12) United States Patent
Hutchin et al.

(10) Patent No.: US 6,580,509 B1
(45) Date of Patent: Jun. 17, 2003

(54) HIGH SPEED HIGH RESOLUTION HYPERSPECTRAL SENSOR

(75) Inventors: Richard A. Hutchin, Woodland Hills, CA (US); Oberdan W. Otto, Camarillo, CA (US)

(73) Assignee: Optical Physics Company, Calabasas, CA (US)

( * ) Notice: Subject to any disclaimer, the term of this patent is extended or adjusted under 35 U.S.C. 154(b) by 0 days.

(21) Appl. No.: 09/556,660

(22) Filed: Apr. 24, 2000

(51) Int. Cl.[7] ................................ G01B 9/02; G01J 3/45
(52) U.S. Cl. ...................... 356/451; 356/521; 356/328; 356/326; 356/305
(58) Field of Search ........................ 356/451, 521, 356/328, 326, 305

(56) References Cited

U.S. PATENT DOCUMENTS

| | | | | |
|---|---|---|---|---|
| 4,534,649 A | * | 8/1985 | Downs | 356/495 |
| 5,208,651 A | * | 5/1993 | Buican | 356/451 |
| 5,596,410 A | * | 1/1997 | Hantel et al. | 356/493 |
| 5,760,899 A | * | 6/1998 | Eismann | 250/226 |
| 5,777,736 A | * | 7/1998 | Horton | 356/456 |
| 5,835,214 A | * | 11/1998 | Cabib et al. | 356/452 |
| 6,079,665 A | * | 6/2000 | Nella et al. | 244/3.16 |
| 6,222,627 B1 | * | 4/2001 | Seitz et al. | 356/326 |
| 6,333,807 B1 | * | 12/2001 | Hatayama et al. | 359/308 |

OTHER PUBLICATIONS

*Remote Sensing By Fourier Transform Spectrometry*, Reinhard Beer, vol. 120 in Chemical Analysis: A Series of Monographs on Analytical Chemistry and its Applications, Chapter 2, The Ideal Fourier Transform Spectrometer, pp. 15–29; Chapter 4, Real Fourier Transform Spectrometers, pp. 55–100; and Chapter 5, Case Studies of Remote Sensing Fourier Transform Spectrometers, pp. 101–127.

Atmospheric corrections: On deriving surface reflectance from hyperspectral imagers, A F H Goetz, J W Boardman, B Kindel, and K B Heidebrecht, *Proceedings of SPIE* (1997) 3118: 14–22.

Performance trade–offs of infrared spectral imagers, J N Cederquist, and C R Schwartz, *Proceedings of SPIE* (1997) 3118: 23–27.

Thermal Imagery Spectal Analysis, B H Collins, R C Olsen, and J Hackwell, *Proceedings of SPIE* (1997) 3118: 94–105.

Updated results from performacne characterization and calibration of the TRWIS III hyperspectral imager, M A Folkman, S Sandor, S Thordarson, T Hedman, D Gleichauf, S Casement, B Quon, and P Jarecke, *Proceedings of SPIE* (1997) 3118: 142–205.

High–speed imaging spectrometry, C E Volin, M R Descour, and E L Dereniak, *Proceedings of SPIE* (1997) 3118: 179–183.

New Approach To Imaging Spectroscopy Using Diffractive Optics, M Hinnrichs, M Massie, *Proceedings of SPIE* (1997) 3118: 194–205.

Quantitative assessment of hyperspectal sensor detection performance, A Sommese, B Shetler, and F P Billingsley, *PRoceedings of SPIE* (1997) 3118: 308–321.

Imaging spectrometers using concentric optics, D R Lobb, *Proceedings of SPIE* (1997) 3118: 339–347.

*4.0 Multispectral and Hyperspectral Sensing*, pp. 4–1 to 4–26.

* cited by examiner

*Primary Examiner*—Robert H. Kim
*Assistant Examiner*—Richard Kim
(74) *Attorney, Agent, or Firm*—Fulbright & Jaworski L.L.P.

(57) ABSTRACT

A high speed high resolution spectral sensor is formed by placing a cascade of chained wide field-of-view Mach-Zender interferometers inside a dispersive sensor between the sensor's grating and the focusing lens. Also is disclosed an optical filter with wide field-of-view capabilities. Such a filter is formed by inserting a plurality of gap plates of certain thicknesses and refractive indices. The invention provides formulas for calculation of optimal dimensions for such gap plates.

19 Claims, 4 Drawing Sheets

Michaelson Interferometer

HIGH SPEED HIGH RESOLUTION HYPERSPECTRAL SENSOR

BACKGROUND OF THE INVENTION

1. Field Of The Invention

The present invention relates to imaging optical devices, and in particular to a wide field-of-view (WFOV) spectral filters and spectral sensors.

2. Background Of The Invention

Optical sensors have long been known and used for remote detection, identification and quantification of objects within a target scene based on the emissive spectra in the mid-wave infrared and long-wave infrared bands. Preferred for achieving a high level of operation of any type of sensors are high signal-to-noise ratio (SNR), fine spectral resolution, and wide area coverage. The two principal technologies available today are dispersive spectrometers and Fourier transform imaging spectrometers (FTIS).

Dispersive spectrometers have a long history in the short-wave infrared band. Dispersive spectrometers operate on what is referred to as a "pushbroom" principle. In such pushbroom devices, a 1×N pixel region of the image is scanned across the scene area, while the width of the image is determined by the field of view of the spectrometer and by the width of the focal plane array (FPA). A dispersive sensor passes the recollimated target beam from the slit off a grating, which diffracts the image to spread in a direction perpendicular to the width of the image, into a dispersive continuum collected by columns of pixels on the FPA. Each pixel along a collection column corresponds to a spectral bin, and the pixels in the row direction (cross scan direction) provide the spatial resolution.

The optical properties of such dispersive systems determine both the spatial and spectral resolutions of the sensor. Specifically, the spectral resolution is governed by the grating length and line pitch and, unlike the FTIS, cannot be varied. The resolution available in dispersive systems is much lower than in FTIS systems. However, the time per pixel to produce all the spectral information in a dispersive system is typically much shorter than in an FTIS. Therefore, the impact of wind, parallax and line of sight motion are all comparatively small for a dispersive system.

An FTIS passes light from a scene through two paths of different effective optical path lengths, and combines the light from the two paths on a FPA, conjugate to the scene. The optical path difference (OPD) between the two optical paths is produced by a traveling mirror, which inherently exhibits motion-associated biases and jitters. Spatial resolution is determined by the pixelized optical system, and spectral resolution is determined by the total stroke of the traveling mirror. As spectral resolution requirements increase, the stroke length increases. The minimum required SNR determines the length of time data is collected, which can be 1–20 seconds. During the time of the stroke, the optical system (which is mounted on a slewing platform such as an airplane) must maintain precise registration of the scene. Changes in the image due to parallax, magnification, aspect angle, vehicle motion, wind and changes in the optical system due to drift and jitter, all combine to misregister the interferogram data cube. The result is degraded spectral resolution, spatial resolution and spectral noise.

Therefore, each of the two technologies has significant drawbacks that affect the overall quality of their performance. Accordingly, there is a need to provide an improved hyperspectral WFOV sensor providing the spectral resolution of a FTIS with the short integration times and fast area collection of a pushbroom dispersive system, while still being relatively simple and inexpensive to manufacture.

SUMMARY OF THE INVENTION

The present invention is directed to WFOV spectral filters and spectral sensors.

Optical filters with sinusoidal output versus wavenumber incorporated in spectral sensors can greatly improve system speed and other performance parameters. The sinusoidal performance is achieved by developing a specific OPD between two components of the light from a given scene. The OPD can be achieved with either a Michelson, Mach-Zender or birefringent interferometer. Utility of an interferometer is greatly enhanced if its OPD is nearly constant over a WFOV. Thus, in a first, separate aspect of the present invention, a WFOV in a filter is achieved by choosing elements and dimensions inside the filter such that the following requirement is satisfied: the first and second derivatives of the optical path difference inside the filter over the incidence angle of the incoming beam equals zero. From a mathematical point of view, the requirements $$\frac{d}{d\theta}OPD = 0 \text{ and } \frac{d^2}{d\theta^2}OPD = 0$$

means no significant dependence of the OPD over the incidence angle θ. From a practical point of view, this formula allows the calculation of necessary dimensions inside a filter.

In a second, separate aspect of the present invention, field of view capability is enhanced in an interferometer of the Michelson or Mach-Zender types by using gap plates of specific refractive indices and thicknesses inside such an interferometer. The calculations based on the idea that $$\frac{d}{d\theta}OPD = 0 \text{ and } \frac{d^2}{d\theta^2}OPD = 0$$

provide the mathematical interrelations of a given OPD, the thicknesses of the plates, and their refractive indices.

In a third, separate aspect of the present invention, the field-of-view capability of an interferometer is enhanced in a situation where the target scene is illuminated by narrow band radiation such as LED (or, in the alternative, where a sensor receives information from a narrow band filter located between the target scene and the sensor). In such a situation, a WFOV is received in the plane of a narrow slit. Information from the scene passes through the narrow slit into the sensor, while maintaining a modest field-of-view in other planes. In the case of a Mach-Zender type interferometer, this is achieved by using a plate in place of both beam-splitters and gap plates. The plate of refractive index n should have a thickness $$t_p = OPD \cdot \frac{\cos\phi_i}{2 \cdot \left(n - \frac{1}{n}\right)}$$

that, after appropriate calculations, readily follows from the venerable equation $$\frac{d^2}{d\theta^2} OPD = 0.$$

In a fourth, separate aspect of the present invention, a one-dimensional wide field of view can be created with a uniaxial birefringent interferometer. Birefringent crystals propagate two linear polarizations with distinct phase velocities. If such a crystal is used to propagate two components of an incoming beam with different polarizations, then locating the scene slit at an angle $\theta$ with respect to the $n_e$ crystal axis will result in a WFOV along the slit, wherein $$\tan\theta^2 = \frac{n_e}{n_0},$$

and $n_o$ and $n_e$ are the crystal's ordinary and extraordinary indices of refraction, respectively.

In a fifth, separate aspect of the present invention, gap plates creating a WFOV are used in a cascade of chained Mach-Zender interferometers. The combination of interferometers with enhanced field-of-view capabilities result in, a separation of optical signals having different wavenumbers and improved spectral resolution uniformly over the WFOV. Because, by design, the OPD of each stage within the system is twice that of the succeeding stage, the determination of the dimensions of the gap plates within one interferometer will dictate the dimensions of the plates within all other interferometers of the system.

In a sixth, separate aspect of the present invention, a cascade of chained interferometers, or hyperspectral filters, is used in combination with a dispersive spectrometer to create a high-speed high-resolution hyperspectral sensor. Such a sensor combines the high SNR and large area collection capacity of a dispersive spectrometer with the excellent spectral resolution of an FTIS. An integration of a cascade of hyperspectral filters with a dispersive system consists of inserting the interferometers between the grating and the imaging lens of a dispersive system, and replicating the lens and focal plane array for each of the output channels of the interferometers.

Accordingly, it is a primary object of the present invention to provide an optical sensor with enhanced field-of-view and area collection capabilities which achieves fine spectral resolution while retaining a short measurement time per pixel. This and further objects and advantages will be apparent to those skilled in the art in connection with the drawings and the detailed description of the preferred embodiments set forth below.

DESCRIPTION OF THE DRAWINGS.

One or more preferred forms of the invention are described herein with reference to the accompanying drawings. The drawings are briefly described below.

DETAILED DESCRIPTION

Figure 1:
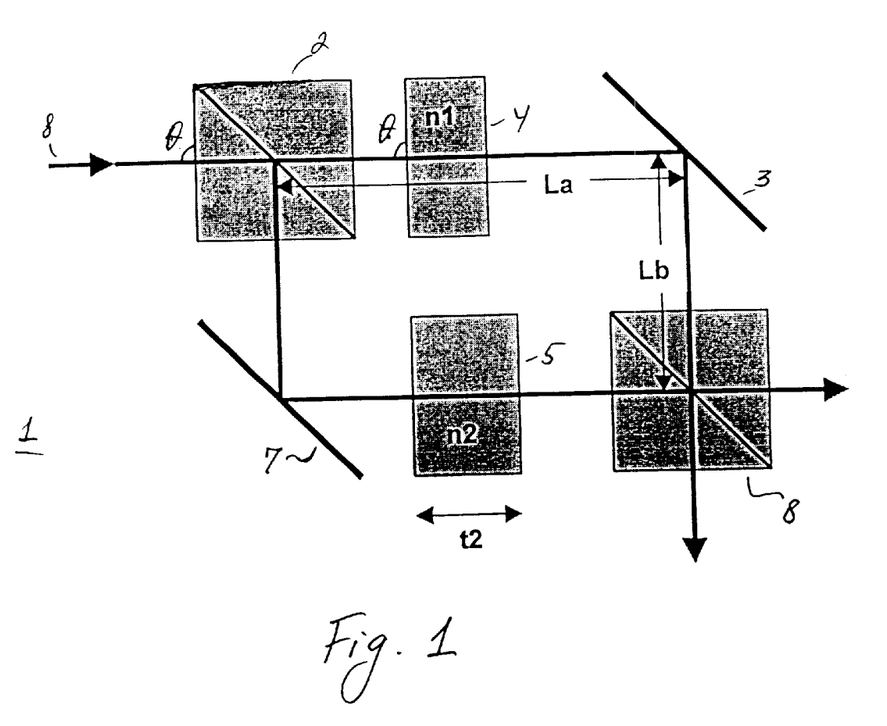
FIG. 1 is a block diagram of a Mach-Zender interferometer with inserted gap plates suitable for a 2D WFOV application.

A simple Mach-Zender interferometer, generally designated 1, as illustrated in FIG. 1. Mach-Zender interferometers can either be formed from discrete components or monolithically. Monolithically formed interferometers provide superior design stability at the cost of increased difficulty in fabrication, and both types are, generally known in the art. The interferometer 1, consists of two beam-splitters 2 and 8 and two mirrors 3 and 7. The beam-splitters and the mirrors are all approximately parallel to each other and are at a forty-five degree angle to the center ray of the interferometer. Upon entering the interferometer 1, an incoming beam is split by the first beam-splitter 2 such that a component of the beam is reflected onto the mirror 3 while another component passes through the beam-splitter 2 on toward the mirror 7. Both components of the beam then coincide at the beam-splitter 8. The beam-splitter 8 serves to recombine the components of the beam 8, creating an interference pattern between them upon their exiting the interferometer.

The type of interferometer depicted on FIG. 1 can be used as part of a sensor producing a two-dimensional spectral image of the target scene. The usual setup for such a sensor would include an imaging lens focusing the image of the scene onto an aperture, a collimating lens passing the image from the aperture onto the interferometer, and a focusing lens producing the image on the FPA. Achieving a WFOV in two dimensions will improve performance for such a sensor.

One of the primary factors governing the performance of any interferometer is the difference between the optical path lengths. For the interferometer on FIG. 1, the lengths of the physical paths forming the optical path lengths are the same and equal La+Lb. Ordinarily, in order to achieve a non-zero OPD, a plate 4 of thickness $t_1$ and refractive index $n_1$ is inserted in one of the optical paths. However, to achieve a WFOV, a second plate 5 of thickness $t_2$ and index $n_2$ is inserted in the second optical path. A study of the OPD dependence on the incidence angle $\theta$ shows that little or no dependence of the OPD on the incidence angle is achieved when the second derivative of OPD over the incidence angle $\theta$ is zero. (The first derivative automatically vanishes here due to symmetry.) This principle enables the calculation of the thicknesses of the plates for a given OPD and indices $n_1$ and $n_2$. Thus, the thickness $t_1$ of the plate 4 should equal $$\frac{OPD}{\left(1 - \frac{1}{n_1}\right) \cdot (n_2 - n_1)}.$$

Once $t_1$ is determined, to guarantee a WFOV, the thickness $t_2$ of plate 5 should equal $$t_1 \cdot \frac{n_2 \cdot (n_1 - 1)}{n_1 \cdot (n_2 - 1)}.$$

Figure 2:
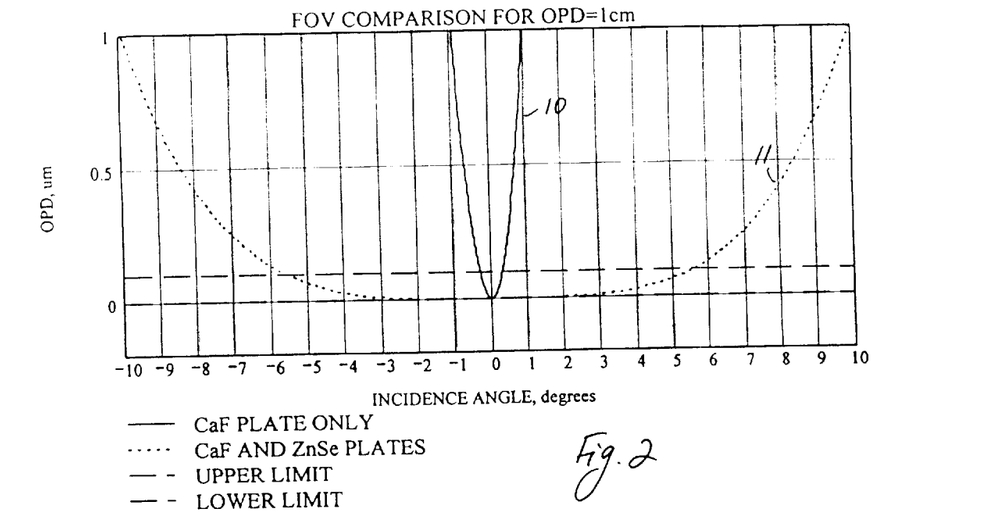
FIG. 2 is an OPD versus incidence angle graph demonstrating an improvement in field-of-view of a Mach-Zender interferometer upon insertion of a second gap plate.
Figure 2A:
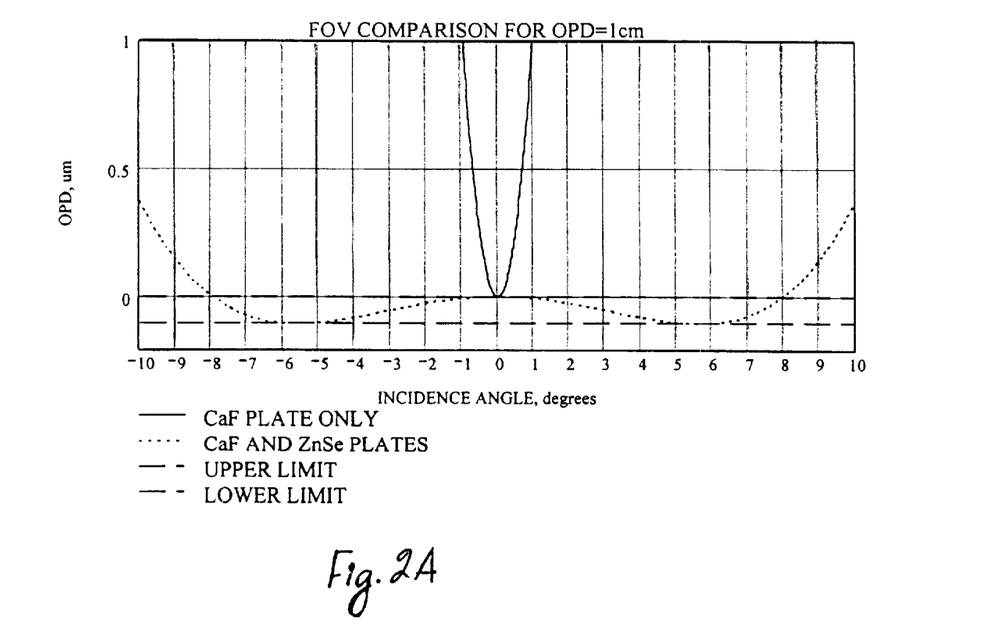
FIG. 2A is an OPD versus incidence angle graph demonstrating a bigger improvement in field-of-view of a Mach-Zender interferometer than in the case illustrated in FIG. 2 upon insertion of a thinner second gap plate.

The graph on FIG. 2 demonstrates the dramatic improvement in field-of-view of the interferometer with two gap plates. The field-of-view for an OPD of 1 cm for the one-plate method is only about 0.6 degrees for an OPD tolerance range of 0.1 $\mu$m as shown by the curve 10. The corresponding field-of-view for the two-plate method is illustrated by the dashed curve 11 and is more than 11 degrees. The reduction of $t_2$ will further improve the field-of-view. FIG. 2A illustrates the field-of-view for the same OPD tolerance range of 0.1 $\mu$m and $t_2$ reduced by 97 $\mu$m. Smaller OPD designs will have an even larger field of view.

Figure 3:
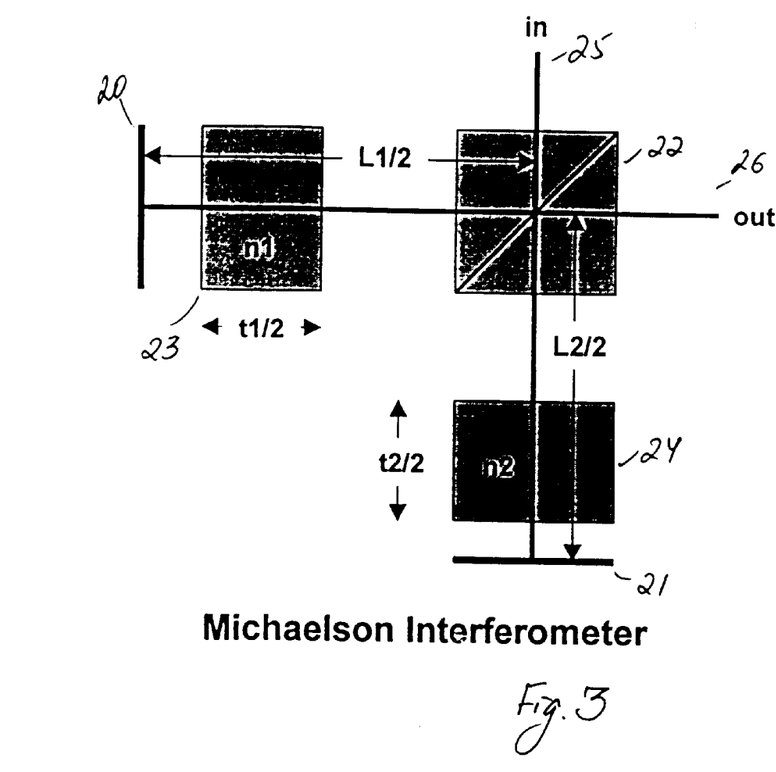
FIG. 3 is a block diagram of a Michelson interferometer with inserted gap plates suitable for a 2D WFOV application.

A two-dimensional spectral image of the target scene can also be achieved through the use of a sensor having a Michelson interferometer illustrated in FIG. 3 as one of its components. In the case of a Michelson interferometer, the semi-transparent and reflective membrane 22 splits the beam 25 into two components that are reflected back onto the beams-splitter by two mirrors 20 and 21 in such a way that the components are recombined into one beam 26 which then leaves the interferometer. One of the mirrors is movable in a direction parallel to the direction of the component of the beam incident on it. Therefore, unlike in the Mach-Zender interferometer, the geometry of the Michelson interferometer may provide a non-zero OPD without the insertion of a gap plate. Further, with the Michelson interferometer, the insertion of just one gap plate 23 is enough to create a WFOV. For a desired OPD and refractive index n of the plate 23, the thickness of the plate equals $$\frac{OPD \cdot n}{2 \cdot (n^2 - 1)}.$$

The difference $L_1 - L_2$ in the lengths $L_1$ and $L_2$ between the mirrors 20 and 21, respectively, and the membrane 22 should then be set to $$\frac{OPD}{n+1}.$$

In some applications in which the interferometer must be tuned through zero OPD as in a scanning FTIS, an implementation with a single plate is impractical because it is not possible to adjust the plate thickness through zero. In this case, a second plate 24 of thickness $t_2$ and refractive index $n_2$ can be used to maintain a WFOV while keeping fixed physical path lengths $L_1$ and $L_2$. Again, the formula $$\frac{d^2}{d\theta^2} OPD = 0$$

enables the calculation of the plate thicknesses as functions of OPD:

$$t_1 = t_{10} + OPD \cdot \frac{n_1}{(n_1 - 1) \cdot (n_1 - n_2)} \text{ and}$$

$$t_2 = t_{20} + OPD \cdot \frac{n_2}{(n_2 - 1) \cdot (n_1 - n_2)},$$

where $t_{10}$ and $t_{20}$ are the values of $t_1$ and $t_2$ at zero OPD, and for a fixed $L_2 - L_1$, $$t_{10} = \frac{n_1 \cdot (L_2 - L_1) \cdot (n_2 - 1)}{(n_1 - 1) \cdot (n_1 - n_2)} \text{ and } t_{20} = t_{10} \cdot \frac{n_2 \cdot (n_1^2 - 1)}{n_1 \cdot (n_2^2 - 1)}.$$

Figure 4:
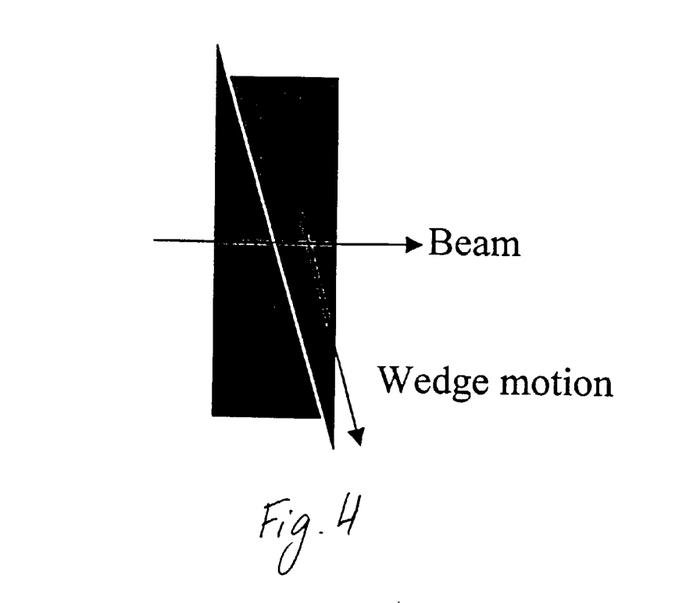
FIG. 4 is an optical effect created by a plate fabricated out of two matched wedges.

Note that his application would use two variable thickness plates, which change in thickness in lock step to scan the OPD while maintaining the WFOV condition. The effect of a variable thickness plate is typically created in the industry by fabricating a plate out of two matched wedges as shown in FIG. 4. As one wedge is slid along the other, the effect is to vary the thickness of the combined wedges which act as a single plate. Anti-reflection coatings are usually required to avoid interference effects in the tiny gap between the wedges.

In situations when the target scene is illuminated by a narrow band radiation (such as by an LED) or is viewed through a narrow band filter, the cascade filter can be used by itself without a dispersive grating or prism. In such a situation, each output beam would be at a separate wavelength within the overall waveband of the narrowband scene.

Figure 5:
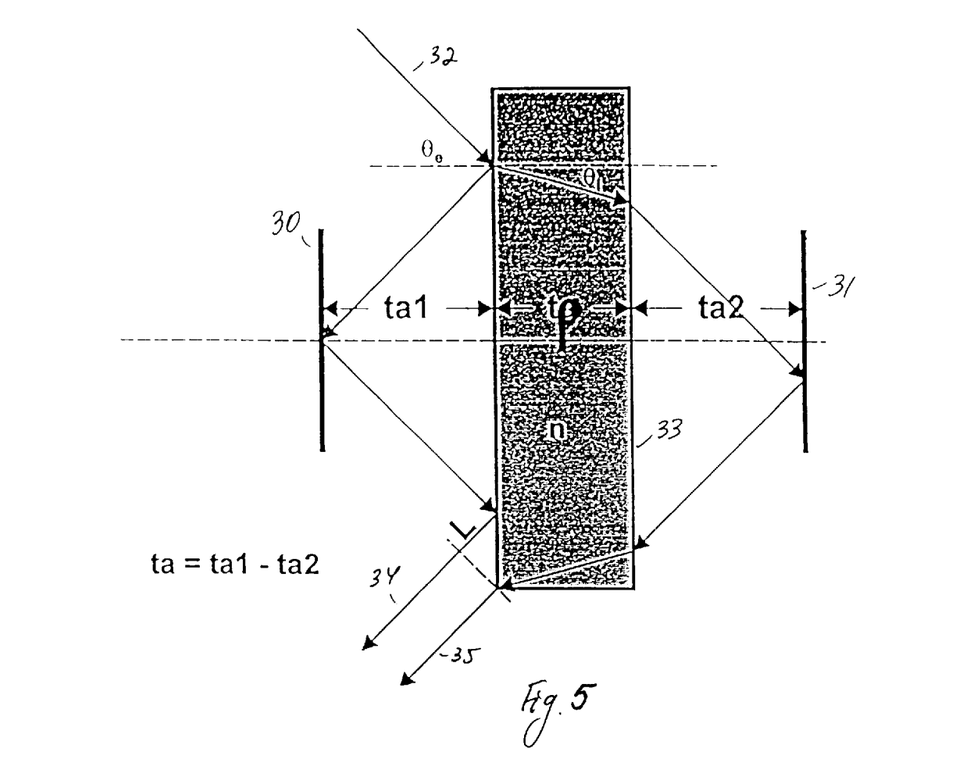
FIG. 5 is a block diagram of a modified Mach-Zender suitable for a 1 D WFOV application.

FIG. 5 illustrates a Mach-Zender interferometer that can be used as a filter component of a sensor to view a slit target scene. For this simplified configuration of a Mach-Zender interferometer, the two beam-splitters and delay plates are replaced by one plate 33 of thickness $t_p$ and index n. The interferometer further includes two adjustable mirrors 30 and 31. Usually, an incidence angle $\theta_e$ of the incoming beam 32 is given, and the Snell law ($\sin \theta_e = n \cdot \sin \theta_i$) enables the calculation of the in-plate incidence angle $\theta_i$. Two outcoming beams 34 and 35 may then be made to coincide (thus rendering a WFOV for a plane defined as including the slit and the incoming beam) when the plate thickness $t_p$ equals $$t_p = OPD \cdot \frac{\cos \theta_i}{2 \cdot \left(n - \frac{1}{n}\right)}.$$

The difference $t_a$ between the adjustable distances $t_{a1}$ and $t_{a2}$ between the mirrors 30 and 31, respectively, should be set at $$t_a = t_p \cdot \frac{\tan\theta_i}{\tan\theta_e}.$$

A wide field-of-view can also be achieved in a birefringent interferometer. Uniaxial birefringent crystals such as Calcite ($CaCO_3$), $LiNbO_3$ and $LiIO_3$ propagate two linear polarizations with distinct phase velocities. The two linear polarizations will experience different optical path lengths because their phase velocities are different. Neglecting reflections at the air-crystal interface, if the optical path difference for the two polarizations is a whole number of waves, then the exiting wave will have the same polarization as the wave that entered.

In an arrangement where the input polarization is linear and oriented at 45-degrees to the crystal axes, there will be equal amounts of the two linear polarizations when the wave enters the crystal. If the OPD between the two polarizations is one wavelength then the output wave will be linearly polarized and oriented the same as the input. If that wave is passed through an analyzer (a polarizer) oriented at the same 45-degrees, then all of the wave will pass through the analyzer. If, on the other hand, the OPD is a half-wavelength, then the output wave will be linearly polarized, but at right angles to the input polarization. It will be completely blocked by the analyzer. For OPDs in between, the amount of light passed by the analyzer will vary sinusoidally between the two extremes, being a maximum at integer wavelength multiples and being a minimum (zero) at half-integer multiples. This behavior is the same as for the above described interferometers, even though the mechanism is a polarization extinction phenomenon instead of an interference phenomenon.

Snell's laws for the two polarizations of a birefringent crystal are:

$$\sin\theta_e \cdot n_1 \sin\theta_{i1} \text{ and } \sin\theta_e \cdot n_2 \sin\theta_{i2},$$

where $\theta_e$ is the external incidence angle, $n_1$ and $n_2$ are the refractive indices for the two polarizations, and $\theta_{i1}$ and $\theta_{i2}$ are the internal refracted angles for the two plarizations. The two refractive indices are:

$$n_1 = n_0 \text{ and } n_2 = \frac{n_e \cdot n_0}{\sqrt{n_0^2 + (n_e^2 - n_0^2) \cdot \cos\phi^2 \cdot \sin\theta_{i2}^2}},$$

where $n_o$ and $n_e$ are the ordinary and extraordinary indices of refraction of the crystal. It is assumed that the crystal's optic axis is vertical (y) and the principal propagation axis is horizontal (z). The angle $\phi$ is the rotation of the incidence plane normal about the z-axis from the x-axis. When $\phi=90$ degrees, the incidence plane normal coincides with the crystal axis (y), $n_2=n_e$ and there is no dependence on incidence angle.

The general equation for a given OPD and its second derivative are:

$$OPD = t \cdot (n_1 \cdot \cos\theta_{i1} - n_2 \cdot \cos\theta_{i2}) \text{ and}$$

$$\frac{d^2}{d\theta_e^2} OPD = t \cdot \left(\frac{n_0 - n_e}{n_0^2 \cdot n_e}\right) \cdot (n_0 \cdot \sin\phi^2 - n_e \cdot \cos\phi^2)$$

These equations define the conditions of a WFOV:

$$\tan\theta^2 = \frac{n_e}{n_0},$$

where $\theta$ is the angle under which the slit is oriented to a vertical axis ($n_e$ axis).

Thus, conditions under which a WFOV can be achieved in interferometers are described. Such enhanced interferometers, or hyperspectral filters, can be chained in stages to constitute a cascade of hyperspectral filters. The Mach-Zender and birefringent types of interferometers are preferred over the Michelson since two optical outputs are physically well separated (either by direction or position) from the optical input. Thus, each interferometer has two complimentary optical outputs, one with a $\cos^2(2\pi K\Delta_n)$ intensity response versus optical wavenumber K, and the other with the complimentary $\sin^2(2\pi k\Delta_n)$ response, in which $\Delta_n$ is the OPD for stage number n (n=1,2, ... N, where N is the number of stages). Each optical output can feed a different interferometer chained to that particular output. A cascade of $2^N-1$ interferometers will generate $2^N$ (for example, a cascade of seven interferometers as shown on FIG. 6 will produce eight output beams). OPDs of the stages are set at $\Delta_n=\Delta_1/2^{n-1}$ (where $\Delta_1$ is the OPD of the first interferometer). The overall response for the chaining N stages is the sharply peaked function $\sin^2(k\Delta_1)/2^{2N}\sin^2(2\pi K\Delta_1/2^N)$. For example, the OPD for stages 1, 2, 3, and 4 might be set to 3.000 mm, 1.500 mm, 0.750 mm and 0.375 mm respectively. The OPD for each successive stage is half that of the preceding stage. The cascading of wide field-of-view interferometers produces a significant improvement in spectral resolution. For example, a four-stage filter produces a 16 times improvement in resolution when used with an FTIS or a dispersive sensor.

The next step is an integration of a bank of chained wide field-of-view interferometers with a dispersive system to produce a high speed high resolution hyperspectral sensor. Such an integration results in a high spectral resolution of a FTIS combined with the short integration times and fast area collection of a pushbroom dispersive system. The system provides the high spectral resolution available with the FTIS while maintaining the simplicity and reliability of the nearly degradation free dispersive sensor.

Figure 6:
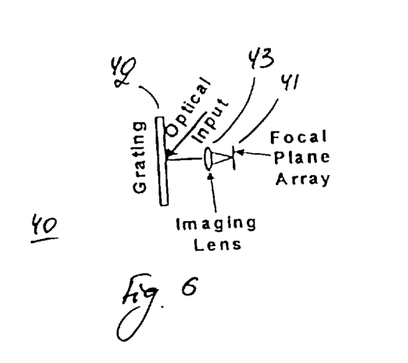
FIG. 6 is a block diagram of a dispersive spectrometer.
Figure 7:
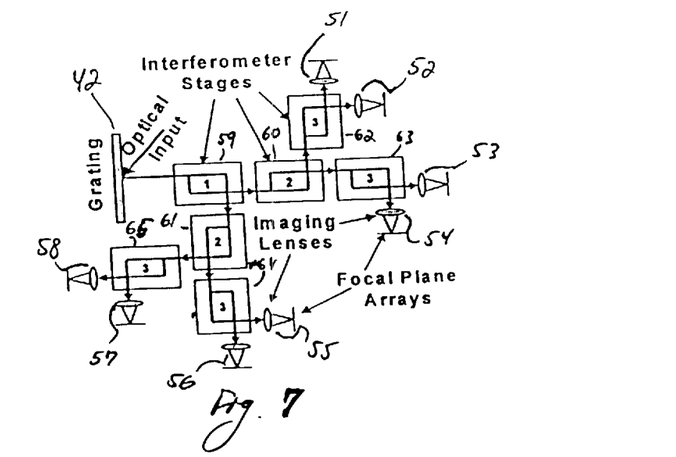
FIG. 7 is a block diagram of a high-speed high-resolution hyperspectral sensor, which merges a dispersive system with a cascaded set of interferometer filters.

FIG. 6 illustrates a conventional dispersive sensor 40 consisting of a grating 42 which converts spectral information to angular information, a lens 43 which converts the angular information to spatial displacement and a FPA 41 to sense the spatial information. Each pixel in the FPA 41 is designed to capture at most one spectral resolution element of the grating 42. Integrating a cascade of chained Mach-Zender interferometers with the dispersive system (FIG. 7) consists of inserting the cascade between the grating 42 and the plurality of imaging lens 51–58. Each of the interferometers 59–65 collects a subspectrum of narrow bands of $\sigma k=\pi/\theta_1$. Each one of these spectral spikes appears on a different pixel in the FPA. The other $2^N-1$ subspectra appear on the other $2^N-1$ FPAs at the outputs of the other $2^N-1$ interferometers in the bank. The result is a system with $2^N$ times the number of spectral bins of the original dispersive component.

Accordingly, methods of achieving a wide field-of-view and enhanced area collection capabilities in the field of optical sensors have been described. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A wide field-of-view hyperspectral filter to filter an image within a field of view, comprising a first optical path and a second optical path, wherein a first derivative of the difference between the first optical path and the second optical path as a function of the incidence angle approaches zero at least once within the field of view and a second derivative of the difference between the first optical path and the second optical path as a function of the incidence angle approaches zero at least once within the field of view.

2. The wide field-of-view hyperspectral filter as recited in claim 1, wherein said filter comprises a Mach-Zender interferometer comprising a pair of mirrors, a pair of beam-splitters, and a pair of gap plates of thicknesses $t_1$ and $t_2$ and refractive indices $n_1$ and $n_2$, wherein $$t_1 = \frac{OPD}{\left(1 - \frac{1}{n_1}\right) \cdot (n_2 - n_1)} \text{ and } t_2 = t_1 \cdot \frac{n_2 \cdot (n_1 - 1)}{n_1 \cdot (n_2 - 1)},$$

wherein OPD is a desired optical path difference inside said interferometer.

3. The wide field-of-view hyperspectral filter as recited in claim 1, wherein said filter comprises a Mach-Zender interferometer comprising two mirrors and a beam-splitter plate of refractive index n and thickness t, wherein $$t = OPD \cdot \frac{\cos\theta_i}{2 \cdot \left(n - \frac{1}{n}\right)},$$

wherein OPD is a given optical path difference inside said interferometer, and $\theta_i$ is an in-plate incidence angle of the entering beam.

4. The wide field-of-view hyperspectral filter as recited in claim 1, wherein said filter comprises a Michelson interferometer comprising a beam-splitter, a pair of mirrors, and at least one gap plate of refractive index n and thickness t, wherein $$t = \frac{OPD \cdot n}{2 \cdot (n^2 - 1)},$$

wherein OPD is a desired optical path difference inside said interferometer.

5. The wide field-of-view hyperspectral filter as recited in claim 1, wherein said filter comprises a Michelson interferometer comprising a beam-splitter, a pair of mirrors, and a first and a second gap plates of refractive indices $n_1$ and $n_2$ and variable thicknesses $t_1$ and $t_2$, respectively, wherein $$t_1 = t_{10} + OPD \cdot \frac{n_1}{(n_1 - 1) \cdot (n_1 - n_2)} \text{ and}$$

$$t_2 = t_{20} + OPD \cdot \frac{n_2}{(n_2 - 1) \cdot (n_1 - n_2)},$$

wherein OPD is a desired variable or tunable optical path difference inside said interferometer, and $t_{10}$ and $t_{20}$ are the values of the thicknesses of said first and second gap plates, respectively, when the OPD is zero.

6. The wide field-of-view hyperspectral filter as recited in claim 1, wherein said filter comprises a system comprising a slit, a birefringent crystal, which has two perpendicular axes along which two linear polarizations are propagated with distinct phase velocities, and two linear polarizers oriented at 45 degrees to the two axes of the crystal and positioned on each side of the crystal, wherein the slit is oriented at angle $\theta$ to the $n_e$ crystal axis such that $$\tan\theta^2 = \frac{n_e}{n_0},$$

wherein $n_o$ and $n_e$ are the crystal's ordinary and extraordinary indices of refraction, respectively.

7. The wide field-of-view hyperspectral filter as recited in claims 2, 3, 4, or 5, wherein said interferometer is formed from discrete components.

8. The wide field-of-view hyperspectral filter as recited in claims 2, 3, 4, or 5, wherein said interferometer is formed monolithically.

9. A wide field-of-view hyperspectral filter comprising a plurality of interferometers chained in successive stages such that each exiting beam of each of said interferometers enters an interferometer of the succeeding stage, wherein the optical path difference inside interferometers of each of said stages is half that inside an interferometer of the preceding stage.

10. The wide field-of-view hyperspectral filter as recited in claim 9, wherein each interferometer of said plurality of interferometers comprises a wide field-of-view hyperspectral filter to filter an image within a field of view, having a first optical path and a second optical path, wherein a second derivative of the difference between the first optical path and the second optical path as a function of the incidence angle approaches zero at least once within the field of view.

11. The wide field-of-view hyperspectral filter as recited in claim 10, wherein said each interferometer comprises a Mach-Zender interferometer comprising a pair of mirrors, a pair of beam-splitters, and a pair of gap plates of variable thicknesses $t_1$ and $t_2$ and refractive indices $n_1$ and $n_2$, wherein $$t_1 = \frac{OPD}{\left(1 - \frac{1}{n_1}\right) \cdot (n_2 - n_1)} \text{ and } t_2 = t_1 \cdot \frac{n_2 \cdot (n_1 - 1)}{n_1 \cdot (n_2 - 1)},$$

wherein OPD is the desired variable or tunable optical path difference inside said interferometer.

12. A hyperspectral sensor comprising a dispersive sensor, which comprises a grating, a focusing lens, and a focal plane array, and a hyperspectral filter positioned between said grating and said focusing lens whose spectral resolution is finer than the dispersive sensor by itself.

13. The high speed high resolution hyperspectral sensors recited in claim 12, wherein said filter satisfies a requirement that the first and second derivatives of the optical path difference inside said filter with respect to the incidence angle of the incoming beam is zero near the central optical ray.

14. The high speed high resolution hyperspectral sensor as recited in claim 13, wherein said filter comprises an orthogonal Mach-Zender interferometer comprising a pair of mirrors, a pair of beam-splitters, and a pair of gap plates of variable thicknesses $t_1$ and $t_2$ and refractive indices $n_1$ and $n_2$, respectively, wherein $$t_1 = \frac{OPD}{\left(1 - \frac{1}{n_1}\right) \cdot (n_2 - n_1)} \text{ and } t_2 = t_1 \cdot \frac{n_2 \cdot (n_1 - 1)}{n_1 \cdot (n_2 - 1)},$$

wherein OPD is a desired variable or tunable optical path difference inside said interferometer.

15. The high speed high resolution hyperspectral sensor as recited in claim 12, wherein said filter comprises a plurality of interferometers chained in successive stages such that each exiting beam of each of said interferometers enters an interferometer of the succeeding stage, wherein the optical path difference inside interferometers of each of said stages is half that inside an interferometer of the preceding stage.

16. The high speed high resolution hyperspectral sensor as recited in claim 15, wherein each interferometer of said plurality of interferometers satisfies a requirement that the first and second derivatives of the optical path difference inside said each interferometer as functions of the incidence angle of the incoming beam are zero at least once within a given optical path difference tolerance range.

17. The high speed high resolution hyperspectral sensor as recited in claim 16, wherein said each interferometer comprises an orthogonal Mach-Zender interferometer comprising a pair of mirrors, a pair of beam-splitters, and a pair of gap plates of variable thicknesses $t_1$ and $t_2$ and refractive indices $n_1$ and $n_2$, wherein $$t_1 = \frac{OPD}{\left(1 - \frac{1}{n_1}\right) \cdot (n_2 - n_1)} \text{ and } t_2 = t_1 \cdot \frac{n_2 \cdot (n_1 - 1)}{n_1 \cdot (n_2 - 1)},$$

wherein OPD is the desired variable or tunable optical path difference inside said interferometer.

18. The high speed high resolution hyperspectral sensor as recited in claims 14 or 17, wherein said filter is formed from discrete components.

19. The high speed high resolution hyperspectral sensor as recited in claims 14 or 17, wherein said filter is formed monolithically.

* * * * *

UNITED STATES PATENT AND TRADEMARK OFFICE
CERTIFICATE OF CORRECTION

PATENT NO.    : 6,580,509 B1
DATED         : June 17, 2003
INVENTOR(S)   : Richard A. Hutchin et al.

It is certified that error appears in the above-identified patent and that said Letters Patent is hereby corrected as shown below:

Column 11,
Line 3, delete "sensors" and insert therefor -- sensor as --.

Signed and Sealed this

Eleventh Day of January, 2005

JON W. DUDAS
*Director of the United States Patent and Trademark Office*